United States Patent
Nishimura et al.

(10) Patent No.: US 10,404,118 B2
(45) Date of Patent: Sep. 3, 2019

(54) VACUUM PUMP

(71) Applicant: Shimadzu Corporation, Kyoto (JP)

(72) Inventors: Taiki Nishimura, Kyoto (JP); Koichi Shimizu, Kyoto (JP); Osamu Ashida, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 297 days.

(21) Appl. No.: 15/392,155

(22) Filed: Dec. 28, 2016

(65) Prior Publication Data

US 2017/0346356 A1   Nov. 30, 2017

(30) Foreign Application Priority Data

May 31, 2016 (JP) ................................ 2016-108977

(51) Int. Cl.
| | | |
|---|---|---|
| *H02K 1/30* | (2006.01) | |
| *F04D 25/06* | (2006.01) | |
| *F04D 29/053* | (2006.01) | |
| *F04D 29/26* | (2006.01) | |
| *F16C 32/04* | (2006.01) | |
| *H02K 1/27* | (2006.01) | |
| *H02K 7/09* | (2006.01) | |

(Continued)

(52) U.S. Cl.
CPC ............ *H02K 1/30* (2013.01); *F04D 19/042* (2013.01); *F04D 19/048* (2013.01); *F04D 25/06* (2013.01); *F04D 25/0606* (2013.01); *F04D 29/053* (2013.01); *F04D 29/058* (2013.01); *F04D 29/26* (2013.01); *F16C 32/0402* (2013.01); *F16C 32/0425* (2013.01); *H02K 1/272* (2013.01);
(Continued)

(58) Field of Classification Search
CPC ............ H02K 1/30; H02K 1/28; H02K 1/272; H02K 1/2733

USPC ............ 310/156.08, 156.12, 156.13, 156.14, 310/261.1, 271
See application file for complete search history.

(56) References Cited

U.S. PATENT DOCUMENTS

| | | | | |
|---|---|---|---|---|
| 4,631,807 A | * | 12/1986 | Kawada | ............... H02K 1/2773 29/418 |
| 7,830,058 B2 | * | 11/2010 | Maeda | ................. H02K 1/2733 29/598 |

(Continued)

FOREIGN PATENT DOCUMENTS

| | | |
|---|---|---|
| CN | 202651939 U | 1/2013 |
| CN | 103069173 A | 4/2013 |

(Continued)

OTHER PUBLICATIONS

Office Action for corresponding Chinese Patent App. No. 201611110055.3, dated Nov. 30, 2018.

(Continued)

*Primary Examiner* — Nguyen Tran
(74) *Attorney, Agent, or Firm* — Renner, Otto, Boisselle & Sklar, LLP

(57) ABSTRACT

A vacuum pump for rotary driving a rotor by a motor to perform vacuum pumping, wherein a motor rotor of the motor includes a yoke fixed to a shaft of the rotor, and a permanent magnet held at the yoke, and the yoke includes a holding portion provided apart from the shaft and configured to hold the permanent magnet, and a pair of fitting portions provided respectively at both ends of the holding portion in an axial direction and bonded to the shaft by fitting, and a radial thickness dimension of each fitting portion is set less than that of the holding portion.

5 Claims, 5 Drawing Sheets

(51) Int. Cl.
  *H02K 1/28* (2006.01)
  *F04D 19/04* (2006.01)
  *F04D 29/058* (2006.01)
(52) U.S. Cl.
  CPC .................. *H02K 1/28* (2013.01); *H02K 7/09* (2013.01); *H02K 1/2733* (2013.01)

(56) References Cited

U.S. PATENT DOCUMENTS

| | | |
|---|---|---|
| 2006/0158053 A1 | 7/2006 | Aschoff |
| 2013/0129482 A1 | 5/2013 | Tsutsui |
| 2014/0175929 A1* | 6/2014 | Horng .................. H02K 1/2733 310/156.08 |
| 2017/0110918 A1* | 4/2017 | Horng .................. H02K 1/2706 |

FOREIGN PATENT DOCUMENTS

| | | |
|---|---|---|
| JP | 1997-046944 A | 2/1997 |
| JP | 2006519581 A | 8/2006 |
| JP | 2014-173431 A | 9/2014 |
| JP | 2014-181628 A | 9/2014 |
| JP | 2015-151932 A | 8/2015 |

OTHER PUBLICATIONS

Office Action for corresponding Chinese Patent App. No. 201611110055.3, dated Apr. 18, 2019.
Office Action for related Japanese Application No. 2016-108977 dated Jun. 26, 2019 and its English translation.

\* cited by examiner

VACUUM PUMP

BACKGROUND OF THE INVENTION

1. Technical Field

The present invention relates to a vacuum pump.

2. Background Art

A DC brushless motor as described in Patent Literature 1 (JP-A-2014-173431) has been known as a motor configured to rotate a rotor of a vacuum pump such as a turbo-molecular pump, for example. A motor rotor provided with a permanent magnet is attached to a shaft of a rotor provided with rotor blades. The motor rotor includes a yoke fixed to the shaft, and the permanent magnet provided at the yoke. Typically, a protective tube made of carbon fiber reinforced plastics (CFRP) and configured to reduce expansion of the permanent magnet due to centrifugal force is provided at the outer periphery of the permanent magnet.

In, e.g., a turbo-molecular pump and a drag pump, a rotor rotates at high speed such as several tens of thousands of revolutions per minute. For such high-speed rotation, an aluminum alloy as a lightweight material exhibiting a high tensile strength has been typically used for the rotor.

In addition, in the case of using the method for fastening the rotor and the shaft together by tight-fitting, when the linear expansion coefficient of the shaft is less than that of the rotor, there is a probability that fitting is loosened due to a temperature increase caused by pump driving. For this reason, an aluminum alloy similar to that of the rotor has been also used for the shaft.

In pump driving, the temperature of the shaft increases due to heat generation caused by friction between the rotor and a gas molecule or heat generation of the motor. In the case of using the shaft made of an aluminum alloy, the shaft has a greater linear expansion coefficient than those of the yoke and the permanent magnet, and therefore, thermal stress is, due to thermal expansion of the shaft, caused at the permanent magnet provided at the yoke. As a result, in pump driving, there is a probability that the permanent magnet is damaged due to the thermal stress.

SUMMARY OF THE INVENTION

A vacuum pump for rotary driving a rotor by a motor to perform vacuum pumping, wherein a motor rotor of the motor includes a yoke fixed to a shaft of the rotor, and a permanent magnet held at the yoke, and the yoke includes a holding portion provided apart from the shaft and configured to hold the permanent magnet, and a pair of fitting portions provided respectively at both ends of the holding portion in an axial direction and bonded to the shaft by fitting, and a radial thickness dimension of each fitting portion is set less than that of the holding portion.

The fitting between each fitting portion and the shaft is tight-fitting.

One of a surface of each fitting portion facing the shaft or a surface of the shaft facing each fitting portion is provided with a raised portion, and the yoke and the shaft are bonded together at the raised portion.

An axial width dimension of a bonded region of each fitting portion is set equal to or less than 10% of an axial width dimension of the yoke.

The radial thickness dimension of each fitting portion is set equal to or less than 10% of an outer diameter dimension of the yoke.

According to the present invention, the life of the permanent magnet provided at the motor rotor can be improved.

DETAILED DESCRIPTION OF THE EXEMPLARY EMBODIMENTS

Figure 1:
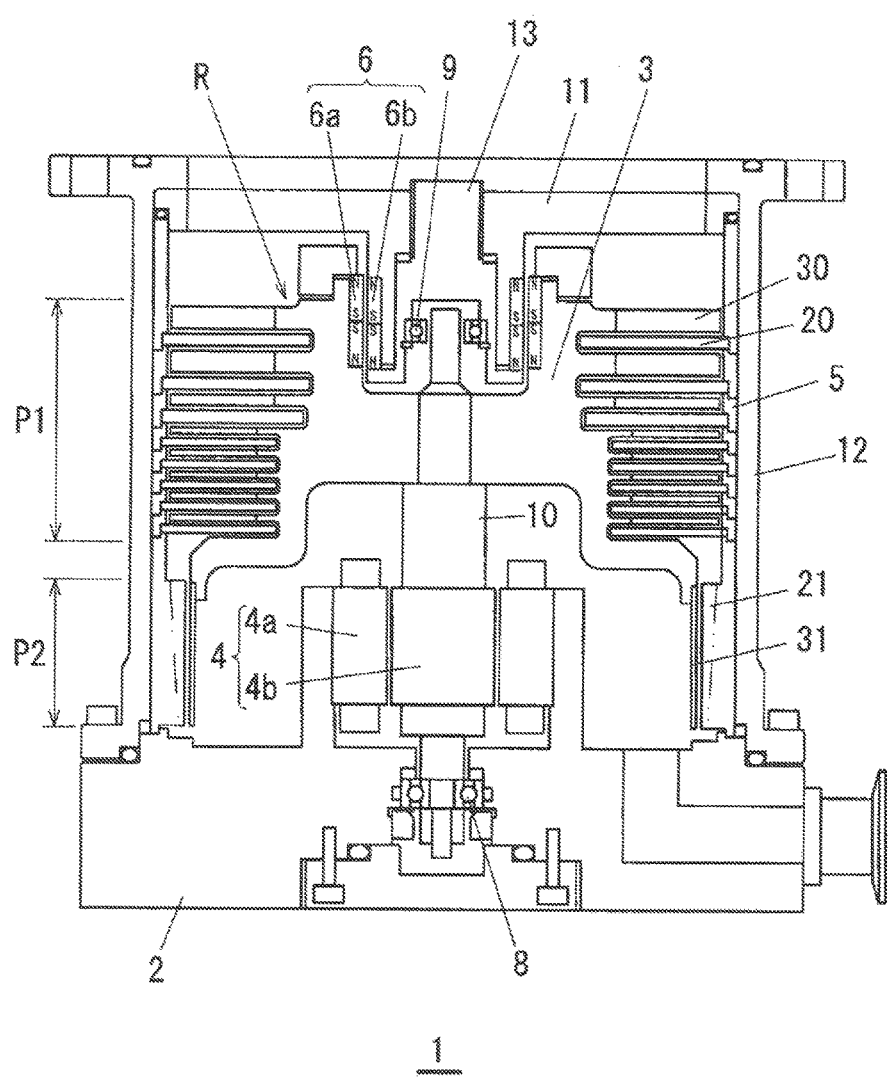
FIG. 1 is a cross-sectional view of a turbo-molecular pump.

Hereinafter, an embodiment of the present invention will be described with reference to drawings. FIG. 1 is a cross-sectional view of a turbo-molecular pump 1. Note that a power supply unit configured to supply power is connected to the turbo-molecular pump 1, but is not shown in FIG. 1.

The turbo-molecular pump 1 illustrated in FIG. 1 includes, as exhaust functions, a turbo pump portion P1 including turbine blades, and a Holweck pump portion P2 provided with a spiral groove. Needless to say, the present invention is applicable not only to a vacuum pump including the turbo pump portion P1 and the Holweck pump portion P2 as the exhaust functions, but also to a vacuum pump including only turbine blades, a vacuum pump including only a drag pump such as a Siegbahn pump or a Holweck pump, or a vacuum pump in combination thereof.

The turbo pump portion P1 includes a plurality of rotor blades 30 formed at a pump rotor 3, and a plurality of stationary blades 20 arranged on a base 2. On the other hand, the Holweck pump portion P2 provided on an exhaust downstream side of the turbo pump portion P1 includes a cylindrical portion 31 formed at the pump rotor 3, and a stator 21 disposed on the base 2. An inner peripheral surface of the cylindrical stator 21 is provided with the spiral groove. The plurality of rotor blades 30 and the cylindrical portion 31 form a rotary side exhaust function, and the plurality of stationary blades 20 and the stator 21 form a stationary side exhaust function.

The pump rotor 3 is fastened to a shaft 10, and the shaft 10 is rotatably driven by a motor 4. For example, a DC brushless motor is used as the motor 4. A motor stator 4a is provided at the base 2, and a motor rotor 4b is provided at the shaft 10. A rotor unit R including the shaft 10 and the pump rotor 3 is rotatably supported by a permanent magnet magnetic bearing 6 using permanent magnets 6a, 6b and a ball bearing 8.

Each permanent magnet 6a, 6b is a ring-shaped permanent magnet magnetized in an axial direction. The plurality of permanent magnets 6a provided at the pump rotor 3 is arranged in the axial direction such that the polarities of opposing ones of the permanent magnets 6a are the same as each other. On the other hand, the plurality of stationary side permanent magnets 6b is attached to a magnet holder 11 fixed to a pump case 12. These permanent magnets 6b are also arranged in the axial direction such that the polarities of opposing ones of the permanent magnets 6b are the same as each other. The axial position of each permanent magnet 6a provided at the pump rotor 3 is set slightly higher or lower than the position of a corresponding one of the permanent magnets 6b arranged on an inner peripheral side of the permanent magnet 6a. As a result, radial magnetic force and axial magnetic force act on the rotor unit R.

A bearing holder 13 configured to hold a ball bearing 9 is fixed to the center of the magnet holder 11. For example, deep groove ball bearings are used as the ball bearings 8, 9. The ball bearing 8 is filled with grease. The ball bearing 9 functions as a bearing configured to restrict radial vibration of an upper shaft portion. The shaft 10 and the ball bearing 9 do not contact each other in a steady rotation state, and the shaft 10 comes into contact with the ball bearing 9 when great disturbance is applied or when whirling of the shaft 10 becomes greater due to acceleration or deceleration of rotation.

Figure 2:
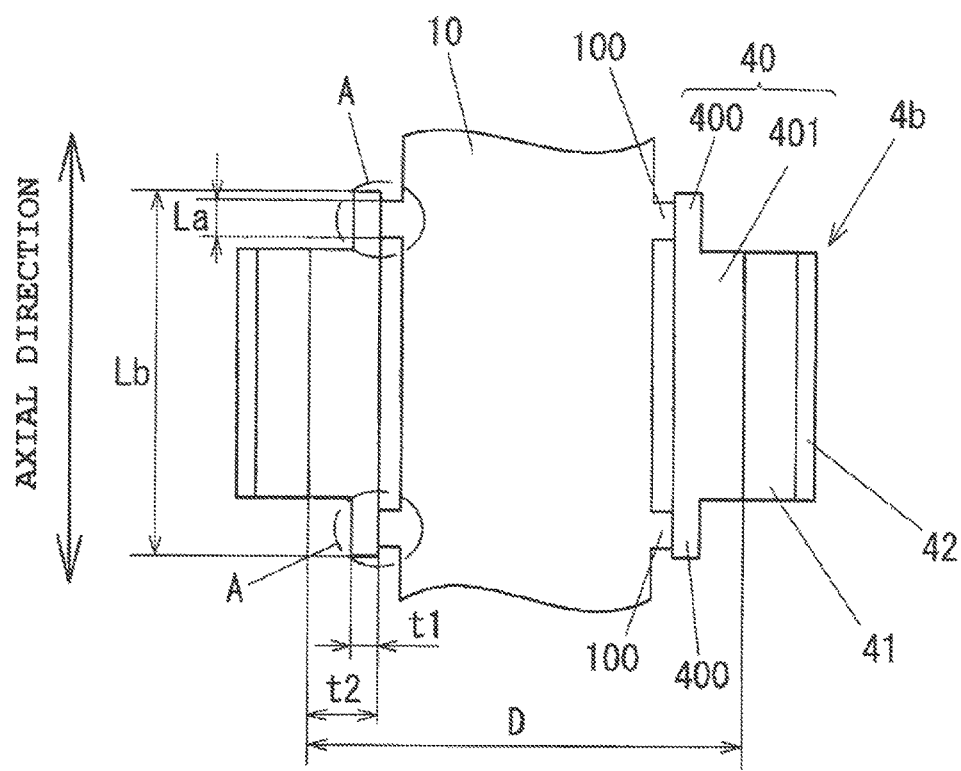
FIG. 2 is a cross-sectional view of a motor rotor configuration.

FIG. 2 is a cross-sectional view of the configuration of the motor rotor 4b provided at the shaft 10. The motor rotor 4b includes a yoke 40, a permanent magnet 41, and a protective tube 42 in this order from the inner peripheral side. Any of the yoke 40, the permanent magnet 41, and the protective tube 42 is formed in a cylindrical shape, and the yoke 40 and the permanent magnet 41 are fixed together with an adhesive. An iron-based metal material is used for the yoke 40, and, e.g., CFRP is used for the protective tube 42.

The yoke 40 and the shaft 10 are tight-fitting bonded together. The yoke 40 includes a holding portion 401 configured to hold the permanent magnet 41, and fitting portions 400 formed respectively at both ends of the holding portion 401 in the axial direction. An outer peripheral surface of the shaft 10 is provided with ring-shaped raised portions 100. The fitting portion 400 and the raised portion 100 are, by fitting, bonded together to form a fitting-bonded portion A. In the present embodiment, the fitting portion 400 and the raised portion 100 are tight-fitting bonded together. In an axial region excluding the fitting-bonded portions A, a clearance is formed between the yoke 40 and the shaft 10. Note that the radial dimension of the clearance is about a clearance-fit dimension, for example.

The radial thickness dimension t1 of the fitting portion 400 is set less than the radial thickness dimension t2 of the holding portion 401. Moreover, the radial thickness dimension t1 of the fitting portion 400 is set equal to or less than 10% of the outer diameter dimension D of the holding portion 401. Further, the axial dimension of the fitting-bonded portion A, i.e., the axial dimension La of the raised portion 100, is set equal to or less than 10% of the axial dimension Lb of the yoke 40.

In the present embodiment, an aluminum alloy is used for the shaft 10, and therefore, a linear expansion coefficient is greater in the shaft 10 than in the iron-based yoke 40. Thus, in order to reduce thermal stress caused at the permanent magnet 41 in thermal expansion of the shaft 10, the fitting portion 400 formed at each end of the yoke 40 in the axial direction is tight-fitting bonded to the shaft 10, and the clearance is formed between the yoke 40 and the shaft 10 at the holding portion 401 holding the permanent magnet 41.

Figure 5:
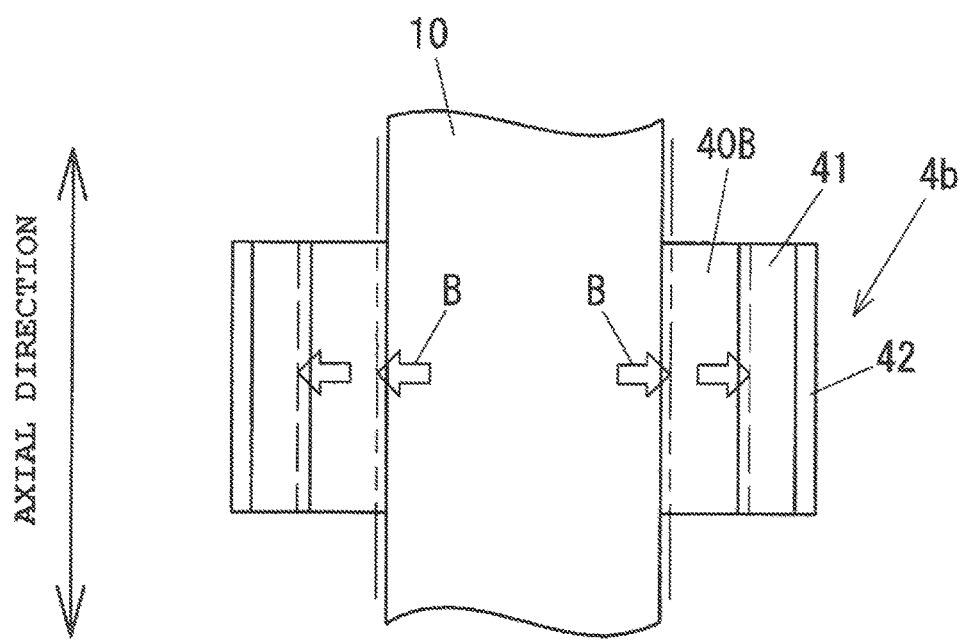
FIG. 5 is a view of a comparative example.

FIG. 5 is a view of an example of a typical motor rotor 4b. A yoke 40B is, at the entirety of an inner peripheral surface thereof, bonded to a shaft 10 by fitting. In the case where the shaft 10 has a greater linear expansion coefficient than those of the yoke 40B and a permanent magnet 41, when the shaft 10 expands due to a temperature increase as indicated by arrows B, strain due to thermal expansion is transmitted to the permanent magnet 41 through the yoke 40B. As a result, damage of the permanent magnet 41 might be caused.

On the other hand, in the present embodiment, since the clearance is formed between the holding portion 401 and the shaft 10, deformation of the shaft 10 due to thermal expansion is not directly transmitted to the holding portion 401. When thermal expansion is caused at the shaft 10, warpage is caused in the vicinity of a boundary between each fitting portion 400 and the holding portion 401, and therefore, outward deformation (strain) of the holding portion 401 in the radial direction can be reduced. As a result, influence of deformation of the shaft 10 due to thermal expansion on the permanent magnet 41 can be reduced, leading to improvement of the life of the permanent magnet 41.

Note that in a later-described second variation (see FIG. 4), the fitting portions 400 and the holding portion 401 are configured to have the same radial thickness dimension. However, the example illustrated in FIG. 2 is set at t1<t2, and therefore, a connection portion between each fitting portion 400 and the holding portion 401 can more easily warp. Consequently, strain transmitted to the permanent magnet 41 can be effectively reduced.

Moreover, the thickness dimension t1 of the fitting portion 400 is preferably equal to or less than 10% of the outer diameter dimension D of the yoke 40. Thus, the connection portion between each fitting portion 400 and the holding portion 401 can more easily warp, leading to more effective reduction in strain transmitted to the permanent magnet 41. Further, the axial dimension La of a bonded region of the fitting portion 400 is preferably equal to or less than 10% of the axial dimension Lb of the yoke 40. Thus, it is easily configured that while the axial dimension of the yoke 40 is reduced, the positions of the raised portions 100 and the holding portion 401 do not overlap with each other in the axial direction.

Since fitting at the fitting-bonded portion A is tight-fitting, deformation of the motor rotor 4b due to a temperature increase and centrifugal force can be reduced, and a change in an unbalance amount at the motor rotor 4b can be reduced. Further, fitting is not made at one point on one side of the motor rotor 4b, but is made at two points on both sides of the motor rotor 4b. This prevents the following problem in advance: an increase in the radial displacement of the yoke end which is not tight-fitted in the case of fitting at one point on one side.

Figure 3:
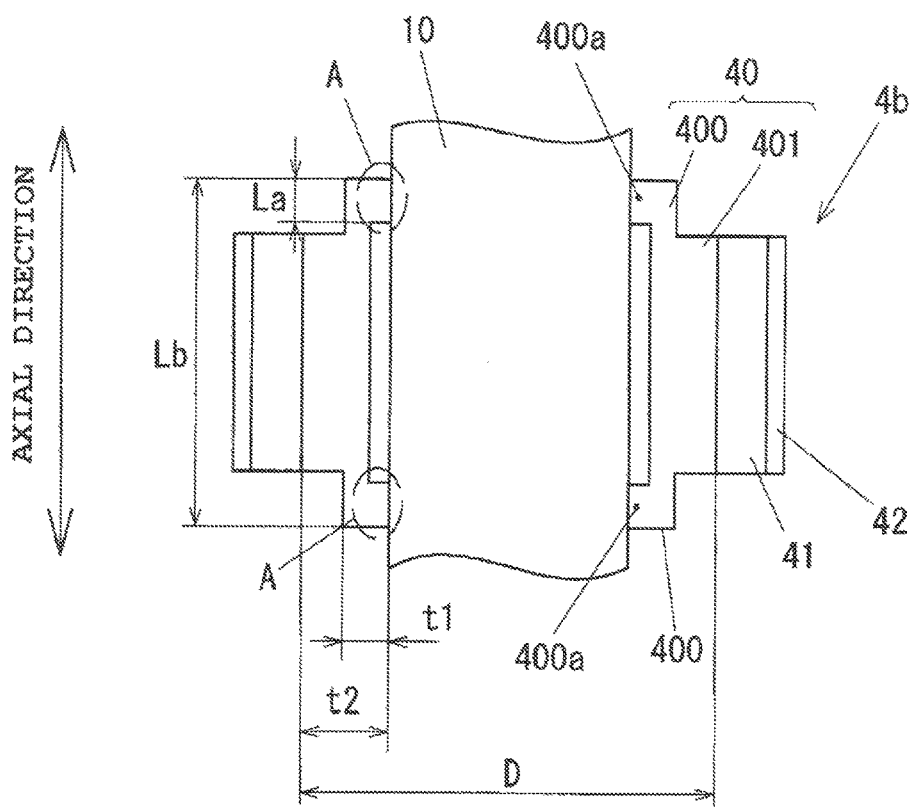
FIG. 3 is a view of a first variation.
Figure 4:
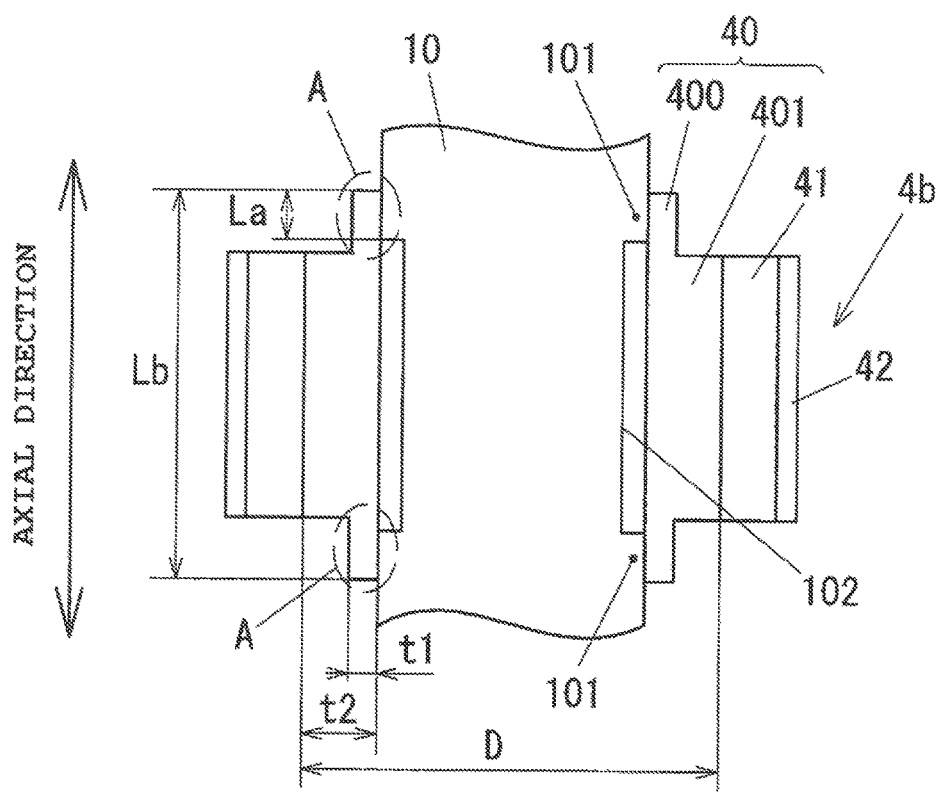
FIG. 4 is a view of a second variation.

FIGS. 3 to 5 are views of variations of the above-described embodiment, and in any of the variations, features and advantageous effects similar to those of the above-described embodiment can be provided.

(First Variation)

FIG. 3 is a view of a first variation. In the first variation, a ring-shaped raised portion 400a is formed at each fitting portion 400 of the yoke 40 instead of providing the raised portions 100 at the shaft 10. The raised portion 400a is formed on the inner peripheral side of each fitting portion 400, and each raised portion 400a and the shaft 10 are bonded together by fitting. In this case, fitting bonding is tight-fitting.

Other configuration is similar to that in the case illustrated in FIG. 2, and the holding portion 401 is formed between the fitting portions 400 in a pair. Moreover, a clearance is formed between the raised portions 400a in a pair. The radial thickness dimension t1 of the fitting portion 400 is set less than the radial thickness dimension t2 of the holding portion 401. The radial thickness dimension t1 of the fitting portion 400 is set equal to or less than 10% of the outer diameter dimension D of the holding portion 401. Further, the axial dimension of the fitting-bonded portion A, i.e., the axial dimension La of the raised portion 400a is set equal to or less than 10% of the axial dimension Lb of the yoke 40.

(Second Variation)

FIG. 4 is a view of the second variation. In the second variation, a ring-shaped recessed portion 102 is provided at the shaft 10 such that a clearance is formed between the yoke 40 and the shaft 10. The shape of the yoke 40 is similar to that of the yoke 40 illustrated in FIG. 2, and includes the fitting portions 400 and the holding portion 401. The fitting portions 400 of the yoke 40 are tight-fitting bonded respectively to large-diameter shaft portions on upper and lower sides with respect to the recessed portion 102 in the axial direction. In the present variation, the large-diameter shaft portion at the fitting-bonded portion A is referred to as a "fitting portion 101." With the above-described recessed portion 102 formed at the shaft 10, the clearance is formed between the yoke 40 and the shaft 10 at the holding portion 401. That is, the holding portion 401 of the yoke 40 is provided between the fitting-bonded portions A in a pair.

Other configuration is similar to that in the case illustrated in FIG. 2. The radial thickness dimension t1 of the fitting portion 400 is set less than the radial thickness dimension t2 of the holding portion 401. Moreover, the radial thickness dimension t1 of the fitting portion 400 is set equal to or less than 10% of the outer diameter dimension D of the holding portion 401. Further, the axial dimension of the fitting-bonded portion A, i.e., the axial dimension La of the raised portion 100, is set equal to or less than 10% of the axial dimension Lb of the yoke 40.

Note that in the above-described embodiment, the case where fitting at the fitting-bonded portion A is tight-fitting has been described. However, as long as it is configured such that the yoke 40 is bonded to the shaft 10 at the fitting portions 400 provided respectively at both ends of the yoke 40 in the axial direction, influence of thermal expansion deformation of the shaft 10 on the permanent magnet 41 can be reduced even in the case of clearance-fitting. Note that in clearance-fitting, each fitting portion 400 and the shaft 10 are bonded together with, e.g., an adhesive.

Various embodiments and variations have been described above, but the present invention is not limited to these contents. Other aspects conceivable within the scope of the technical idea of the present invention are included in the scope of the present invention.

What is claimed is:

1. A vacuum pump for rotary driving a rotor by a motor to perform vacuum pumping, wherein
   a motor rotor of the motor includes
      a yoke fixed to a shaft of the rotor, and
      a permanent magnet held at the yoke, and
   the yoke includes
      a holding portion provided radially apart from the shaft so as to define a space therebetween in a radial direction, and the holding portion configured to hold the permanent magnet radially outward from the holding portion, and
      a pair of fitting portions provided respectively at both ends of the holding portion in an axial direction and bonded to the shaft by fitting, and
   a radial thickness dimension of each fitting portion is set less than that of the holding portion.

2. The vacuum pump according to claim 1, wherein the fitting between each fitting portion and the shaft is tight-fitting.

3. The vacuum pump according to claim 1, wherein one of a surface of each fitting portion facing the shaft or a surface of the shaft facing each fitting portion is provided with a raised portion, and
   the yoke and the shaft are bonded together at the raised portion.

4. The vacuum pump according to claim 1, wherein an axial width dimension of a bonded region of each fitting portion is set equal to or less than 10% of an axial width dimension of the yoke.

5. The vacuum pump according to claim 1, wherein the radial thickness dimension of each fitting portion is set equal to or less than 10% of an outer diameter dimension of the yoke.

* * * * *